(12) United States Patent
Andersen et al.

(10) Patent No.: US 8,261,774 B2
(45) Date of Patent: Sep. 11, 2012

(54) INLET STRATIFICATION DEVICE

(75) Inventors: Elsa Andersen, Farum (DK); Simon Furbo, Nærum (DK)

(73) Assignee: Danmarks Tekniske Universitet, Lyngby (DK)

( * ) Notice: Subject to any disclaimer, the term of this patent is extended or adjusted under 35 U.S.C. 154(b) by 222 days.

(21) Appl. No.: 11/884,038

(22) PCT Filed: Feb. 7, 2006

(86) PCT No.: PCT/DK2006/000064
§ 371 (c)(1),
(2), (4) Date: Aug. 8, 2007

(87) PCT Pub. No.: WO2006/084460
PCT Pub. Date: Aug. 17, 2006

(65) Prior Publication Data
US 2008/0163950 A1 Jul. 10, 2008

(30) Foreign Application Priority Data
Feb. 11, 2005 (DK) ................................ 2005 00205

(51) Int. Cl.
*E03B 11/00* (2006.01)
*E03B 7/07* (2006.01)
(52) U.S. Cl. .......................... 137/592; 137/563; 137/549

(58) Field of Classification Search .................. 137/563, 137/549, 550, 545, 592
See application file for complete search history.

(56) References Cited

U.S. PATENT DOCUMENTS
4,146,087 A * 3/1979 Johansson .................... 165/132

FOREIGN PATENT DOCUMENTS
DE 10316363 10/2004
WO WO 8001714 A * 8/1980
WO WO02039028 5/2002

OTHER PUBLICATIONS
Yee C K et al., "Effects of a Porous Manifold on Thermal Statification in a Liquid Storage Tank", Soler Energy, Pergamon Press. Oxford, GB, vol. 71, No. 4, 2001, pp. 241-254. XP004273561.

* cited by examiner

*Primary Examiner* — John Rivell
*Assistant Examiner* — Atif Chaudry
(74) *Attorney, Agent, or Firm* — Cooper & Dunham LLP

(57) ABSTRACT

An inlet stratification device (5) for a circuit circulating a fluid through a tank (1) and for providing and maintaining stratification of the fluid in the tank (1). The stratification device (5) is arranged vertically in the tank (1) and comprises an inlet pipe (6) being at least partially formed of a flexible porous material and having an inlet (19) and outlets formed of the pores of the porous material. The stratification device (5) further comprises at least one outer pipe (7) surrounding the inlet pipe (6) in spaced relationship thereto and being at least partially formed of a porous material.

10 Claims, 5 Drawing Sheets

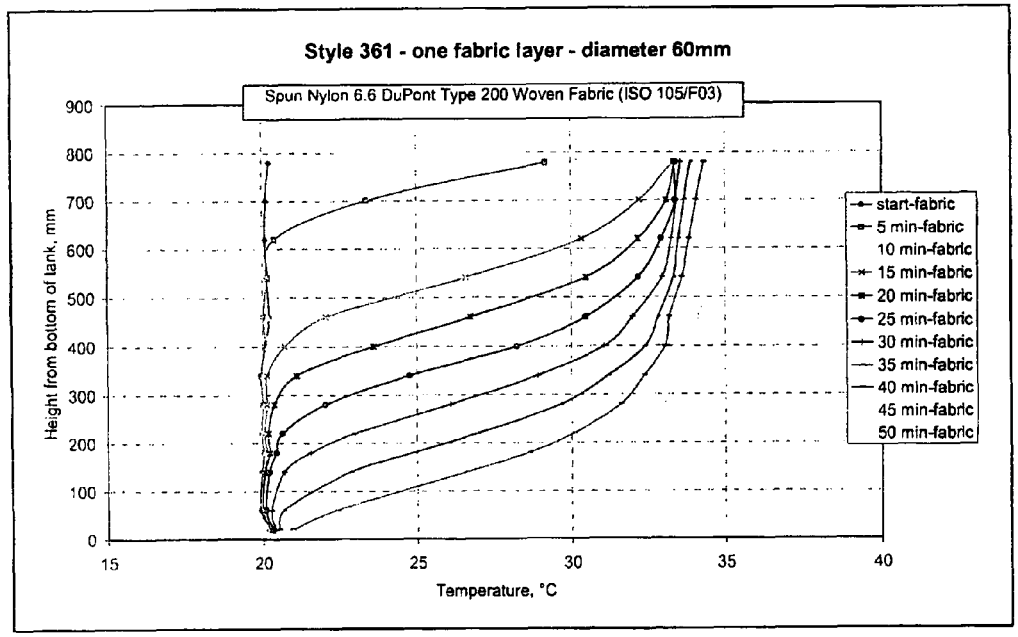
FIG. 3 Heating test with a one layer stratification inlet pipe.
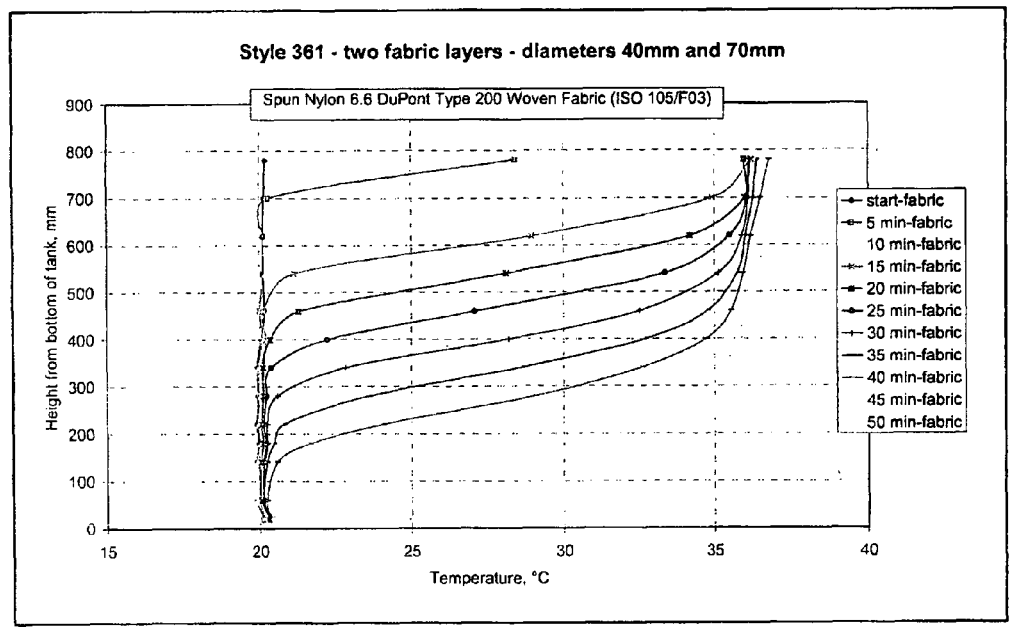
FIG. 4 Heating test with a stratification device according to the invention.

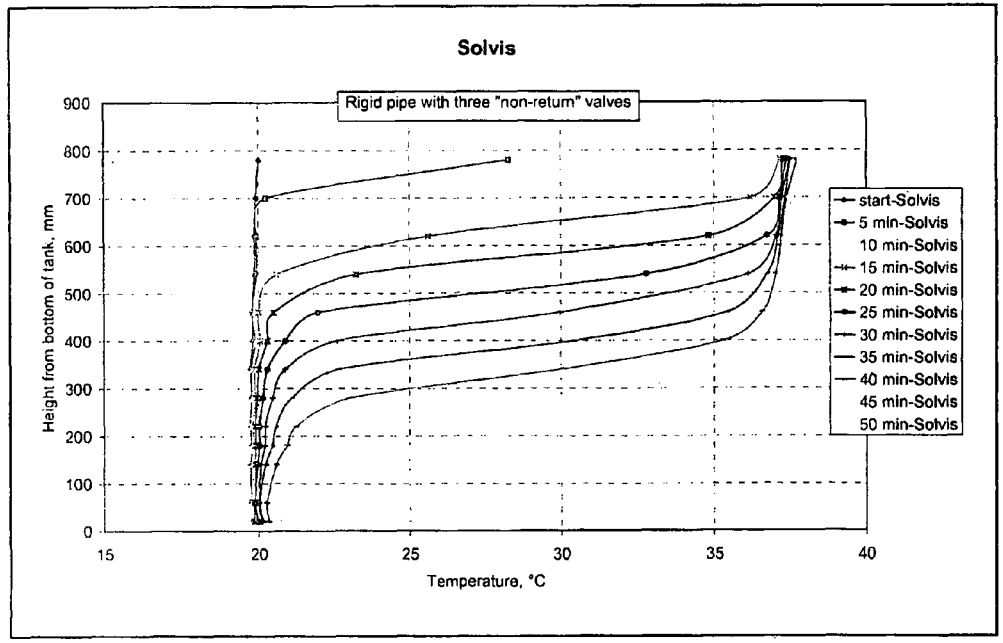
FIG. 5 Heating test with a rigid stratifier with three non-return valves.
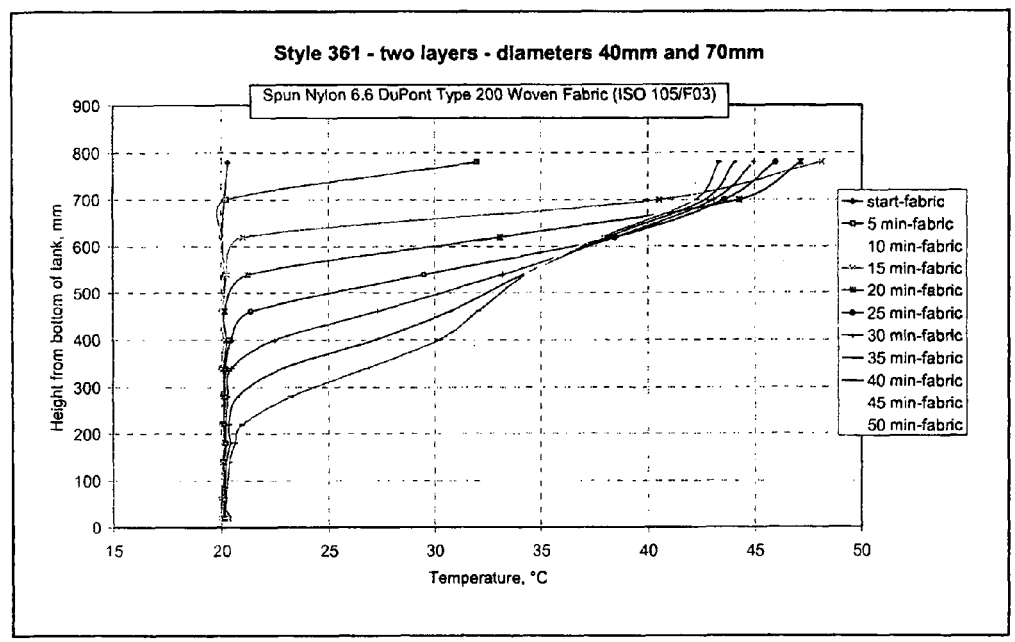
FIG. 6 Stratified test with a stratification device according to the invention.

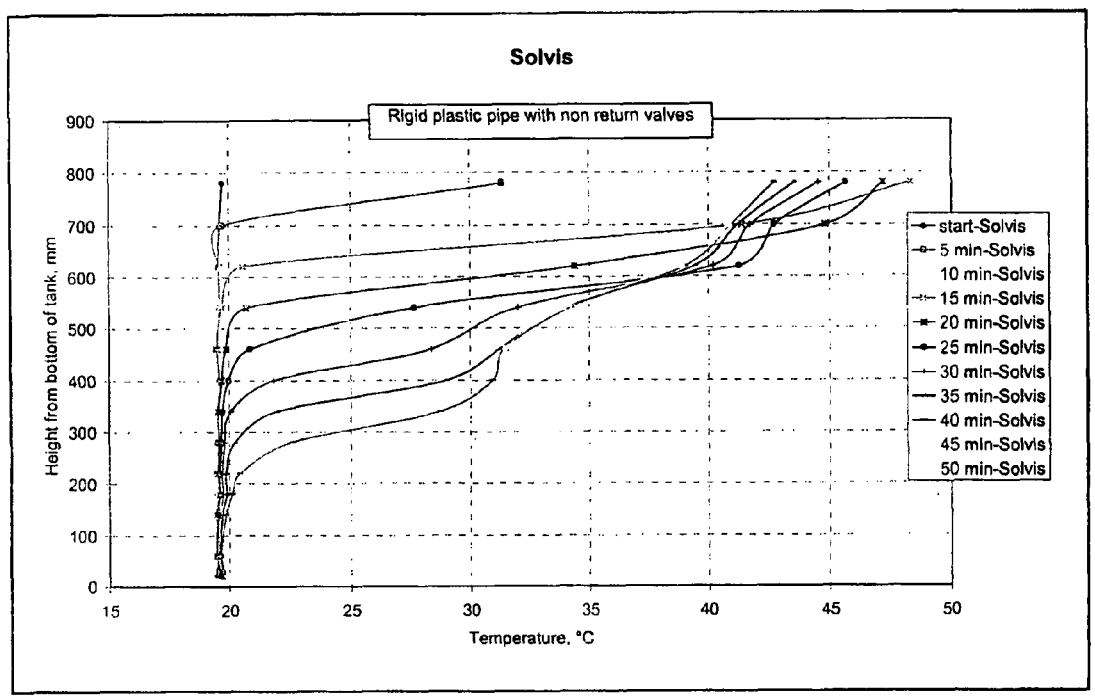
FIG. 7 Stratified test with a rigid stratifier with three non-return valves.

INLET STRATIFICATION DEVICE

TECHNICAL FIELD

The present invention relates to an inlet stratification device for a circuit circulating a fluid through a tank and for providing and maintaining stratification of the fluid in the tank, said stratification device arranged vertically in the tank and comprising an inlet pipe being at least partially formed of a flexible porous material and having an inlet and outlets formed of the pores of the porous material.

BACKGROUND ART

It is well known that by leading heated water into a solar tank through a stratification device from the bottom of the tank, good thermal stratification can be achieved in the tank. The thermal stratification is achieved because the stratification device ensures that the heated water in the stratification device only enters the tank when the temperature in the tank equals the temperature in the stratification device or when the water in the stratification device is forced to leave the stratification device at the top thereof. Good thermal stratification enhances the thermal performance of solar heating systems.

Different types of stratification devices are known. DE 102 12 688 A1 and DE 39 05 874 A1 (owned by the company Solvis GmbH) disclose a tank with a vertically arranged stratification device comprising a rigid inlet pipe having a number of outlet openings provided with flaps that work as non-return valves. This known stratification device is comparatively complicated and thus expensive. Further entering water can only enter the tank at the level of the openings which might not be at the right level according to the thermal conditions of the water in the tank. As a result, the stratification of the water in the tank might be impaired.

Furthermore, WO 80/01714 A1 discloses a device for use in a tank containing liquid and wherein the liquid is caused to attain a condition of equilibrium, in which the temperature of the liquid increases in a steady manner from the bottom to the surface, ie. is stratified.

The tank houses a unit comprising two chambers mounted one above the other. The upper chamber is supplied with heated liquid via a pipeline and the lower chamber is supplied with cooled liquid via a pipeline. The two chambers each have two side walls, ie, an inner wall and an outer wall, formed of two concentric, radially interspaced, perforated cylinders.

The cylinders are made from a material possessing low thermal capacity and poor thermal conductivity in order to have as slight effect as possible on the stratification in the tank. The perforations of the cylinders allow for liquid flow therethrough.

In order to reduce the risk of disturbing the stratification in the tank, with radial spacing the chambers are enclosed by an inner cylindrical filter fabric and an outer filter fabric. The outer filter fabric is distended by means of three annular plates. The inner filter fabric is held in position by means of the inner circumference of the annular plates.

Additionally, JP 11037682A discloses a heat storage tank provided with so-called diffusers arranged horizontally. Each diffuser comprises an inner tube and an outer tube. An axially extending opening is formed in the outer tube. A large number of holes oriented in directions approximately opposite to that of the opening of the outer tube are formed in the inner tube.

Moreover, stratification devices consisting of a single inlet pipe formed of a porous fabric are known. Examples of such stratification devices, which are also called fabric stratifiers or fabric stratification manifolds, are disclosed in the articles: "Fabric Stratification Manifolds for Solar Water Heating", J. H. Davidson and D. A. Adams, Transaction of the ASME, vol. 116, August 1994, pages 130-136, and "Stratification Enhancement in Liquid Thermal Storage Tanks", R. I. Loehrke et al, I. Energy, May-June 1979.

The advantage of using a flexible fabric pipe as a stratification inlet pipe is that the fabric pipe can expand or collapse leading to an equalization of the pressure in the pipe and in the tank. This action tends to prevent inflow and outflow through the porous pipe until a level of equal densities and thus temperatures in the pipe and the tank has been reached. The liquid in the pipe will first enter the tank when it either reaches the top of the pipe, where it is forced to leave the pipe, because new water is constantly fed into the pipe, or when the temperature in the pipe equals the temperature in the tank leading to a slightly higher pressure in the pipe than in the tank. The pipe will expand in an attempt to equalize the pressure difference, but the expansion is limited by the expansion properties of the fabric which leads to a flow of liquid from the pipe into the tank at the right temperature level.

Because a single layer of fabric is very thin, heat is constantly transferred from/to the fabric pipe to/from the tank resulting in impaired stratification.

DISCLOSURE OF INVENTION

The object of the present invention is to provide an inexpensive and well-performing stratification device of the type stated in the introduction.

The stratification device according to the invention is characterised in that it further comprises at least one outer pipe surrounding the inlet pipe in spaced relationship thereto and being at least partially formed of a porous material.

By means of the spacing between the inlet pipe and the outer pipe, the above undesirable heat transfer between the inlet pipe and the tank is reduced. As a result, thermal stratification in the tank is built up in an optimum manner. One possible non-exclusive reason for the enhanced stratification is rendered below in connection with a situation where the fluid entering the inlet pipe is hot water and cold water is present in the tank.

The distance or space between the inlet pipe and the outer pipe reduces the heat transferred horizontally from the hot water in the inlet pipe to the cold water in the tank. Heat is transferred through each pipe wall leading to an upward flow about each pipe wall. When the distance between the pipe walls is sufficiently large, a laminar flow may develop and a small amount of heat is transferred from the inlet or stratification device to the tank. When the distance between the pipe walls is too small, the flow is disturbed and becomes turbulent and a large amount of heat is transferred from the stratification device to the tank. On the other hand, a large surface area of the stratification device increases the heat transfer between the stratification device and the tank. By arranging the pipes with the optimum distance between the pipe walls, heat transfer from the stratification device to the tank can be substantially reduced compared to the heat transfer in known fabric stratification devices.

Furthermore, due to the pervious pipes of the stratification device according to the invention, water always flows from the stratification device to the tank at the right level according to the thermal conditions in the tank. Thus, the levels allowing flow from the stratification device to the tank are not fixed as is the case for the rigid stratification devices according to DE 102 12 688 A1 and DE 39 05 874 A1.

Finally, the stratification device according to the invention is comparatively simple and inexpensive to manufacture.

The stratification device according to the invention can be used in a number of different applications, such as Water storages for solar combi-systems: Inlet stratifiers in the solar collector loop (heat is transferred from the solar collector loop to the loop with storage water), return pipe from the space heating system, and maybe return pipe with heat from the auxiliary energy system.

Hot-water tanks for solar domestic hot-water systems: Return pipe with heated water from the solar collectors (heat is transferred from the solar collector loop to the loop with domestic water), return pipe from circulation pipe, and maybe return pipe with heat from the auxiliary energy system. Further for mantle tanks: Return pipe with solar collector fluid from the solar collector in the mantle inlet. Furthermore for thermo siphoning solar domestic hot-water systems: Return pipe with heated domestic hot water directly from the solar collector.

Hot-water storages for solar heating centrals: Return pipe with heat from the solar collector field (heat is transferred from the solar collector loop to the heat exchanger loop).

Hot water storages for wood burners: Return pipe from the space heating system.

Smart tanks, where the auxiliary heated water volume can be varied to fit the actual consumption. These tanks which can be heated by a number of different energy systems (even with a constant flow temperature) can be heated from the top of the tank with the stratification device.

According to the invention the inlet pipe may be a closed pipe apart from the inlet and outlets thereof.

Furthermore, the space between the inlet pipe and the at least one outer pipe may be closed at opposite ends of the pipes. In practice, it has proved advantageous to close or cap the ends of the pipes so as to provide a closed stratification device apart from the inlet and the pores of the inner and outer pipes.

Moreover, according to the invention the at least one outer pipe may be at least partially formed of a flexible porous material, which may be fabric. Correspondingly, the material of the inlet pipe may be a fabric.

It should be noted that the inlet pipe in its entirety may be made from a flexible porous material, such as a fabric. Optionally, portions of the inlet pipe may be formed of an impervious material, such as a tube. Thus, a rigid impervious tube may extend from the bottom of the tank to a predetermined level, eg. to the middle of the tank.

It should further be noted that the inlet of the stratification device may comprise a tube of an impervious material arranged in the interior of the inlet pipe and extending from the bottom of the tank to a predetermined level, eg. to the middle of the tank.

In practice, excellent results have been obtained with a fabric inlet pipe and a fabric outer pipe.

It should also be noted that in addition to one outer pipe spaced radially apart from the inlet pipe the stratification device may include additional outer pipes being arranged with interspacing about the said one outer pipe.

Furthermore, the inlet of the inlet pipe may be arranged at the bottom of the tank. It is, however, also possible to arrange the inlet of the inlet pipe at the top of the tank. It should also be noted that the inlet of the inlet pipe may be arranged at any desirable point between the opposite ends of the pipes.

The stratification device may be mounted in the tank in various manners.

One option is to secure the inlet end of the stratification to the bottom of the tank and to provide the end opposite the inlet with a floating device ensuring that the stratification device always is in a vertical position.

Another option is to secure the opposite ends of the stratification device to the top and bottom of the tank, respectively.

Moreover, according to the invention, the stratification device may include a framed structure, the opposite ends of the inlet pipe and the at least one outer pipe being fixed to the framed structure so as to maintain a predetermined fixed interspacing between the said opposite ends. The framed structure may advantageously be secured to a cover for closing an opening in the bottom of the tank. The framed structure of the stratification device is then inserted into the tank through the opening and the cover is secured to the tank so as to seal the opening of the tank. As a result, the stratification device is arranged vertically in the tank.

The framed structure may be a latticework, eg. a tubular latticework.

Finally, according to the invention the stratification device may include a semi-tubular member having a longitudinally extending lateral opening and being made from a rigid insulating material such as foamed plastics, the opening being closed by an inner sheet of a flexible porous material, such as a fabric, and an outer sheet of a flexible material, such as a fabric, in spaced relationship thereto, an inner wall of the semi-tubular member and the inner sheet defining the inlet pipe, and side walls of the semi-tubular member and the outer sheet defining the outer pipe.

The present invention also relates to a tank provided with a stratification device according to one or more of the attached claims.

BRIEF DESCRIPTION OF THE DRAWINGS

The invention is explained in detail below with reference to the drawings, in which FIGS. 3-5 illustrate the results of heating tests performed with a one-layered fabric stratification inlet pipe, a stratification device according to the present invention, and a rigid stratifier with three non-return valves (Solvis), respectively, FIGS. 6-7 illustrate the results of stratified tests performed with a stratification device according to the present invention and a rigid stratifier with three non-return valves (Solvis), respectively.

BEST MODE(S) FOR CARRYING OUT THE INVENTION

Figure 1:
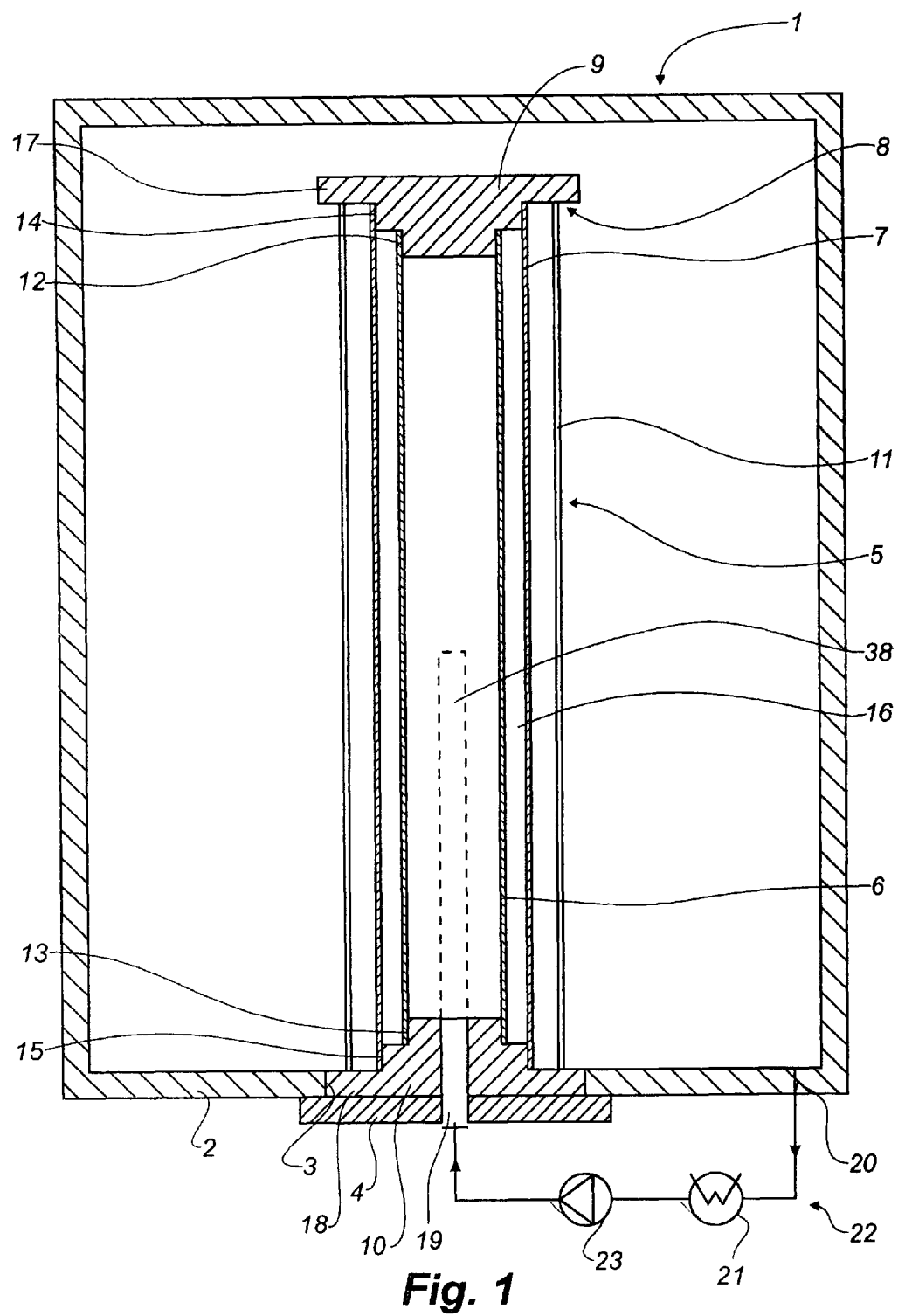
FIG. 1 is a diagrammatic longitudinal sectional view through a first embodiment of a stratification device according to the invention arranged vertically in a tank.

FIG. 1 discloses a tank 1 having a bottom 2 provided with an opening 3 which is closed by means of a cover 4.

Inside the tank a first embodiment of a stratification device 5 according to the invention is arranged vertically. The stratification device comprises an inlet pipe 6 formed of a porous fabric and an outer pipe 7 surrounding the inlet pipe in spaced relationship thereto, the outer pipe also being formed of a porous fabric. The inlet pipe 6 and the outer pipe 7 are retained in the vertical position by means a framed structure 8 comprising an upper cap member 9 and a lower cap member 10 being mutually connected by means of a number of rods 11.

The upper and lower cap member each comprises a first ledge 12, 13 of a small diameter corresponding to the inner diameter of the inlet pipe, the upper and lower ends of the inlet pipe being fixed to the respective first ledge 12, 13 of the respective upper and lower cap members 9, 10. The upper and lower cap members each further comprises a second ledge 14, 15 of a large diameter corresponding to the inner diameter of the outer pipe 7, the upper and lower ends of the outer pipe 7 being fixed to the second ledge 14, 15 of the upper and lower cap members 9, 10, respectively. As a result, a space 16 is provided between the inlet pipe and the outer pipe. Moreover, both the upper cap member 9 and the lower cap member 10 is each provided with a respective flange portion 17, 18. Finally, the lower cap member 10 is provided with an inlet 19 to the inlet pipe 6. The lower cap member 10 is fixed to the cover 4 by not-shown means.

Also shown is a heating circuit 22 comprising an outlet 20 provided at the bottom of the tank 1. From this outlet 20 cold water flows through a diagrammatically shown heat exchanger 21 transferring heat from solar collectors. From the heat exchanger 21 the water flows back to the bottom of the tank and into the inlet pipe 6 through the inlet 19. A pump 23 is arranged in the circuit 22.

The heated water from the heat exchanger 21 flows upwards inside the inlet pipe 6. The water only flows through the pores or small openings of the inlet pipe 6 and the outer pipe 7 at a level at which the temperature of the stratified water in the tank corresponds to the temperature of the stratification device 5 or when the water is forced to leave the stratification device at the top thereof. The latter is effected when the water temperature at the top of the tank is lower than that of the incoming heated water. As explained above, this function is possible since the fabric pipes 6, 7 of the stratification device expand and collapse to equalize the pressure in the device and the tank to prevent inflow and outflow through the porous fabric pipes 6, 7 of the device until a level of equal temperatures has been reached.

Finally, it should be noted that the inlet 19 may be extended by means of a rigid tube 38 of an impervious material and shown by means of dotted lines, said tube extending upwards from the bottom to a predetermined level, eg. to the middle, of the tank.

Figure 2:
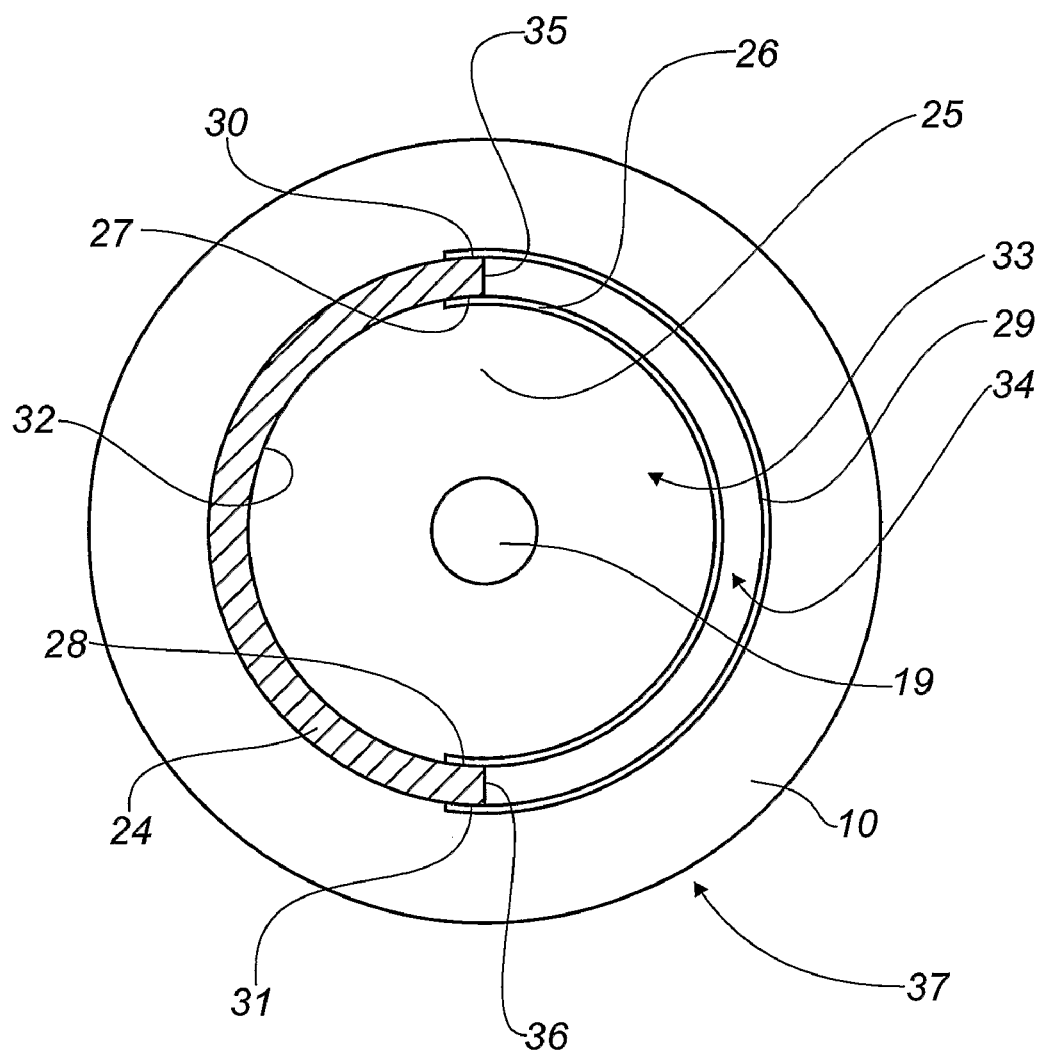
FIG. 2 is sectional view through a second embodiment of a stratification device according to the invention.

FIG. 2 shows a cross-sectional view of a stratification device 37 according to the invention comprising an elongated semi-tubular member 24 having a longitudinally extending lateral opening 25. The semi-tubular member 24 is comparatively thick-walled and formed of a rigid material having low thermal conductivity, eg. foamed plastics.

The lateral opening 25 is closed by means of an inner sheet 26 of a porous fabric connected to opposite longitudinal inner edges 27, 28 of the semi-tubular member 24. The lateral opening 25 is further closed by means of an outer sheet 29 of a porous fabric connected to opposite longitudinal outer edges 30, 31 of the semi-tubular member 24. Thus an inlet pipe 33 is defined by the inner wall 32 of the semi-tubular member 24 and the inner sheet 26, and an outer pipe 34 is defined by the inner sheet 26, the outer sheet 29 and the end walls 35, 36 of the semi-tubular member 24.

The inlet pipe 33 and the outer pipes 34 are closed at their opposite ends by means of cap members similar to the cap members 9, 10 shown in FIG. 1, only the lower cap member 10 provided with the inlet 19 being shown in FIG. 2. The inlet 19 is shown centrally arranged, but may advantageously be arranged adjacent the inner wall 32 of the semi-tubular member 24.

The stratification device 37 operates in a manner similar to that described above with reference to the first embodiment of the stratification device 5, the only difference being the flexible porous fabric sheets 26, 29 of the inlet pipe 33 and the outer pipe 34 being able to collapse and expand so as to equalize pressure and prevent inflow and outflow through the pipes until a level at which the temperature in the pipe equals the temperature in the tank.

The following two types of comparative tests have been performed on known stratification devices and a stratification device according to the present invention:
  Heating test in which hot water enters the cold tank through the stratification device;
  Stratified test in which water being colder than the water at the top of the tank and warmer than the water at the bottom of the tank enters the stratified tank through the stratification device.

The tank has a volume of 0.144 m$^3$ and a height of 900 mm of. The volume flow rate is about 2 litres per minute. The duration of each test is 50 minutes. Water enters the inlet of the stratification device through the bottom of the tank in the centre of the tank in a manner similar to that shown in FIG. 1.

FIGS. 3-5 show the thermal stratification in the tank during a period in which hot water is led into a cold tank through a single layer fabric stratifier of a diameter of 60 mm (FIG. 3), a fabric stratification device according to the invention having a fabric inlet pipe of a diameter of 40 mm, an outer fabric pipe of a diameter of 70 mm (FIG. 4) and a rigid stratifier with three non-return valves (FIG. 5).

FIGS. 6-7 show the thermal stratification in the tank during a period in which water is led into a stratified tank through the above fabric stratification device having pipes of diameters of 40 mm and 70 mm, respectively (FIG. 6) and a rigid stratifier with three non-return valves (FIG. 7). The incoming water is colder than the water at the top of the tank and warmer than the water at the bottom of the tank.

It is apparent from the FIG. 3-5 showing the heating tests that the fabric stratification device according to the invention is superior to a pipe with a single fabric layer. It is also apparent that the rigid stratifier with three non-return valves performs slightly better than the two-layer fabric stratification device according to the invention.

It is apparent from FIGS. 6-7 showing the stratified test that the stratification device according to the invention performs slightly better than the rigid stratifier with three non-return valves.

Summing up, the performed tests reveal that the performance of a stratification device is superior to that of known single layer fabric stratifiers and slightly better than that of a rigid stratifier with non-return valves in the stratified test, said latter test corresponding more closely to a typical operation than the heating test.

LIST OF REFERENCE NUMERALS

1. Tank
2. Bottom
3. Opening
4. Cover
5. Stratification device
6. Inlet pipe
7. Outer pipe
8. Framed structure
9. Upper cap member
10. Lower cap member
11. Rods
12. First small ledge of upper cap member
13. First small ledge of lower cap member
14. Second large ledge of upper cap member
15. Second large ledge of lower cap member
16. Space
17. Flange portion of upper cap member 18. Flange portion of lower cap member
19. Inlet
20. Outlet from tank
21. Heat exchanger
22. Circuit
23. Pump
24. Semi-tubular member
25. Lateral opening
26. Inner sheet
27, 28 Inner edges
29 Outer sheet
30, 31 Outer edges
32 Inner wall of semi-tubular member
33 Inlet pipe
34 Outer pipe
35, 36 End walls
37 Stratification device
38 Inlet tube

The invention claimed is:

1. An inlet stratification device for providing and maintaining stratification of a fluid in a tank, said stratification device arranged vertically in the tank and comprising
an inlet pipe at least partially formed of a flexible porous material and having an inlet, an upper end and a lower end, and wherein the inlet pipe is provided with outlets formed of the pores of the porous material; and
at least one outer pipe surrounding the inlet pipe and being at least partially formed of a flexible porous material and having outlets formed of pores of the porous material, and having an upper end and a lower end,
wherein the inlet pipe and the at least one outer pipe are configured to collapse and expand such that inflow and outflow through the pores of the flexible porous material of the inlet pipe and the at least one outer pipe is substantially prevented in regions of the inlet stratification device where the temperature of the fluid inside the device differs from the temperature of the fluid outside of the device.

2. The stratification device according to claim 1, wherein the inlet pipe is a closed pipe apart from the inlet and outlets thereof, and wherein surfaces of the inlet pipe and outer pipe are concentric and parallel where the temperature of the fluid outside of the device is substantially equal to temperature of the fluid inside of the device.

3. The stratification device according to claim 1, wherein there is no open space between the inlet pipe and the at least one outer pipe at the upper and lower ends of the pipes.

4. The stratification device according to claim 1, wherein the flexible porous material of the inlet pipe is a fabric.

5. The stratification device according to claim 1, wherein the material of the at least one outer pipe is a fabric.

6. The stratification device according to claim 1, wherein the inlet of the inlet pipe is arranged at a bottom of the tank, and wherein said inlet is the sole inlet of the stratification device.

7. The stratification device according to claim 1, wherein the inlet of the inlet pipe is disposed adjacent to the lower ends of said pipes, and wherein the upper end of the pipes is closed.

8. The stratification device according to claim 1, wherein the stratification device comprises a framed structure, the upper and lower ends of the inlet pipe and the at least one outer pipe being fixed to the framed structure so as to maintain a predetermined fixed interspacing between the said upper and lower ends.

9. The stratification device according to claim 1, further comprising a semi-tubular member having an inner semi-tubular surface and an outer semi-tubular surface and a longitudinally extending lateral opening, said semi-tubular member comprising rigid insulating material, wherein said opening is spanned by an inner sheet of a flexible porous material fixed to the semi-tubular member at the inner semi-tubular surface and an outer sheet of a flexible material fixed to the semi-tubular member at the outer semi-tubular surface, such that the inner semi-tubular surface and the inner sheet define the inlet pipe, and outer semi-tubular surface and the outer sheet define the outer pipe.

10. The stratification device according to claim 9, wherein the flexible porous material of the outer sheet and the inner sheet is a fabric.

* * * * *